UNITED STATES PATENT OFFICE.

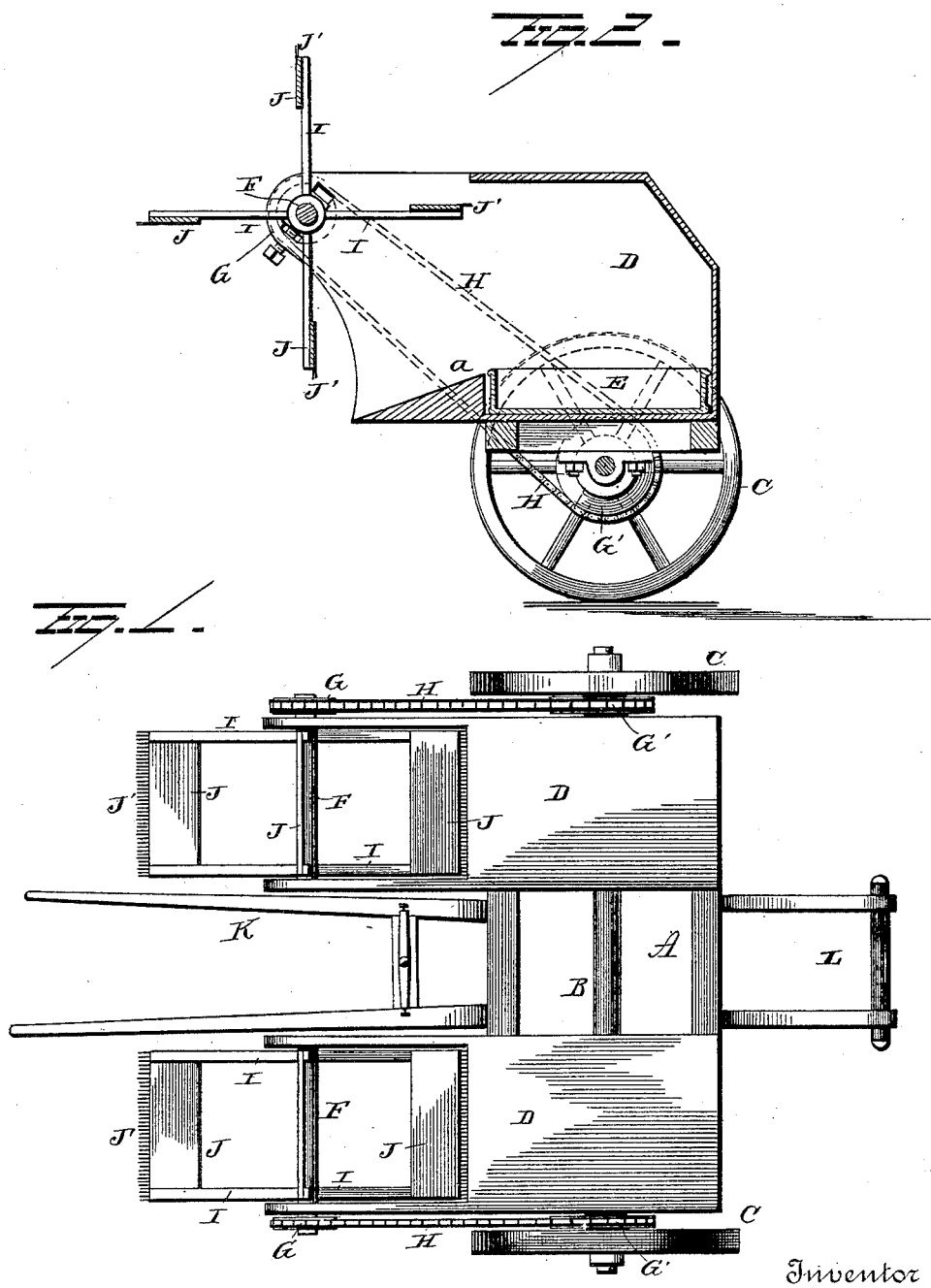

ALANSON ANSLEY, OF GENEVA, NEW YORK.

INSECT-CATCHER.

SPECIFICATION forming part of Letters Patent No. 453,792, dated June 9, 1891.

Application filed October 3, 1890. Serial No. 366,928. (No model.)

*To all whom it may concern:*

Be it known that I, ALANSON ANSLEY, a citizen of Geneva, in the county of Ontario and State of New York, have invented certain new and useful Improvements in Insect-Destroyers; and I do hereby declare the following to be a full, clear, and exact description of the invention, such as will enable others skilled in the art to which it appertains to make and use the same.

My invention relates to an improvement in insect-destroyers, and more particularly to devices for removing bugs from potato-plants, the object of the invention being to produce a simple device by means of which potato-bugs may be automatically brushed from potato-plants and made to fall into a suitable receptacle.

A further object is to so construct the device that two rows of plants may be acted upon simultaneously and the bugs be made to fall into a receptacle containing poison.

A further object is to produce a device for removing potato-bugs from plants by means of which the bugs may be brushed rearwardly from the plants and made to fall into a pan containing poison.

A further object is to produce a machine for the purpose stated, which shall be simple in construction, comparatively cheap to manufacture, and effective in the performance of its functions.

With these objects in view the invention consists in certain novel features of construction and combinations of parts, as hereinafter set forth, and pointed out in the claims.

In the accompanying drawings, Figure 1 is a plan view of the device. Fig. 2 is a vertical sectional view.

A represents a suitable frame mounted on an axle B, on which latter carrying-wheels C C are mounted. Located on each end of the frame A are boxes D, closed at their rear ends and open at their front ends, as shown in Fig. 2. On the bottom of each box D is an upwardly-projecting flange $a$, which serves to retain a pan E in place in the boxes D, which pan is intended to contain kerosene or other poison. The tops of the sides of the boxes D are projected somewhat beyond the bottoms of said boxes, and journaled in said forwardly-projecting top portion of each box are shafts F, each of which is extended somewhat beyond its bearing and provided with a sprocket-wheel G for the reception of sprocket-chains H, which chains also pass over sprocket-wheels G', carried by the axle B or carrying-wheels C C, whereby motion is imparted to the shafts F. Secured to each shaft F is a series of (preferably eight) arms I, which are connected together in pairs by a series of wings or paddles J, having fringe J', of any suitable material, secured to their edges, as shown in Fig. 1. Thills K are connected to and adapted to project forwardly from the frame A, and immediately in rear of said thills and projecting from the frame A are handles L. The pans E, being provided with kerosene or similar material, are placed in the boxes D and the machine started, the paddles or wings J being adapted to operate on two rows of potatoes at a time. As the machine advances, the paddles are driven by the mechanism previously explained, and the bugs will be brushed from the plants and made to fall rearwardly into the pans of kerosene in the boxes D.

The device is very simple in construction, effective in operation, and cheap to manufacture.

Slight changes might be made in the details of construction without departing from the spirit of my invention or limiting its scope. Hence I do not wish to limit myself to the precise details of construction herein set forth; but, Having fully described my invention, what I claim as new, and desire to secure by Letters Patent is—

1. In an insect-destroyer, the combination, with a frame provided with one or more boxes closed at their top and rear ends and open at the front, of revolving paddle-wheels located forward of the open front, and means for revolving the same, said wheels adapted to brush insects from the plants back into the boxes with the forward movement of the machine, substantially as set forth.

2. In an insect-destroyer, the combination, with a frame provided with one or more boxes closed at their tops and backs and open in front, and a flange in its bottom with an inclining forward edge, of revolving paddle-wheels located forward of the open front, and gearing for rotating the paddle-wheel, substantially as set forth.

In testimony whereof I have signed this specification in the presence of two subscribing witnesses.

A. ANSLEY.

Witnesses:
 EDGAR PARKER,
 G. W. NICHOLAS.